Patented Nov. 3, 1936

2,059,609

UNITED STATES PATENT OFFICE 2,059,609

MOLDING MATERIAL

Edmund Charles Rossiter and Alfred Brookes, Strand, London, England, assignors, by mesne assignments, to American Cyanamid Company, a corporation of Maine No Drawing. Application May 6, 1931, Serial No. 535,562. Renewed August 14, 1935. In Great Britain July 23, 1930

4 Claims. (Cl. 260—3)

This invention relates to molding compositions and particularly to those containing condensation products of a urea-formaldehyde type.

It is well known that in the manufacture of urea-formaldehyde condensation products, the presence of alkali or acid in very small quantities greatly influences the course of the condensation and during the stage of curing a molding powder or laminated sheet made from such condensation products it is generally necessary that acid or a substance acting as an acid be present if the cure is to take place in a time and at a temperature which are reasonable for industrial practice.

It has been proposed during the initial stages of condensation to add ammonia to the formalin in order to neutralize the formic acid which commercial formalin always contains. This neutralization is, however, only temporary and the solution on being heated again becomes acid. The reactions which take place are not definitely known; presumably the ammonia in the ammonium formate is converted to hexamethylene tetramine, thus liberating the formic acid; at the same time the urea or its initial condensation products reacts with the hexamethylene tetramine to form a basic substance of an unstable nature; whatever reactions occur, the final result is an acid solution which if allowed to stand too long causes the urea condensation product to be precipitated in an insoluble form which is useless for the manufacture of molding powder.

Hexamethylene tetramine is frequently added to molding powders made from phenol-formaldehyde condensation products in order to accelerate the cure which it accomplishes extremely well. On the other hand, it has no accelerating action on the curing properties of molding powders made from urea condensation products, in fact any action which may occur tends slightly to retard the cure.

Another property of these urea-condensation products is their instability in the presence of acids even at atmospheric temperatures. Therefore, although a molding powder made from a urea condensation product should contain a small quantity of an acid or a substance acting as an acid in order that it may cure quickly at a reasonable temperature, yet the presence of this acid makes the resin so unstable that the molding powder is liable to lose its flow on storage and thereby to become useless. The same result is liable to occur when the accelerator is a susbtance that is potentially acid, i. e. that will liberate acid during the molding, for there may be a slow liberation of acid during storage at ordinary temperatures and this will cause loss of flow. Neutral salts of hexamethylene tetramine, for example, are likely to behave in this manner.

The present invention, which overcomes this difficulty, consists in incorporating free hexamethylene tetramine in a plastic molding composition or powder made from condensation products of the urea-formaldehyde type and containing an acid or a substance that is potentially acid, the amount of hexamethylene tetramine being sufficient to ensure a quantitative excess of total base over total acid present. Although loss of flow in the composition is prevented owing to the binding of all free acid present or liberated during storage, the relatively small proportion of hexamethylene tetramine does not appreciably retard the molding of the resin under heat and pressure.

As an example of our process a urea-formaldehyde molding powder is made in the usual manner up to the stage where about half the necessary grinding is finished; an accelerator for example ½-2% of hexamethylene tetramine sulphocyanide or ½-1% of oxalic acid or other suitable acid is then added and from ½ to 2% hexamethylene tetramine, and the grinding finished, the total quantity of hexamethylene tetramine being more than sufficient to neutralize the total acid present. A molding powder made in this way is far more stable at ordinary temperatures than one which does not contain hexamethylene tetramine, and will withstand storage even at a temperature of 38° C. (100° F.) for a considerable time without losing its flow; on the other hand, the action of the accelerator is not unduly retarded at the molding temperature and the powder can be cured quickly at a reasonable temperature.

It is understood that the proportion of hexamethylene tetramine used may be varied, subject to the requirement that it is in excess of what is required to bind the total acid present, and that the invention likewise applies to solid molding material prepared for hot pressing in other than powder form, e. g. in sheets, rods, bars or similar units.

Other suitable changes and variations may be made without departing from the spirit and scope of the invention.

We claim:

1. A relatively stable, moldable composition in powdered form capable of being stored for relatively protracted periods, comprising a urea-formaldehyde condensation product, an acid yielding salt of hexamethylene tetramine, and hexamethylene tetramine in an amount sufficient to insure an excess of total base over total acid present during storage.

2. A relatively stable, moldable composition in powdered form capable of being stored for relatively protracted periods, comprising a urea-formaldehyde condensation product, hexamethylene tetramine sulphocyanide, and hexamethylene tetramine in an amount sufficient to insure an excess of total base over total acid present during storage.

3. A relatively stable, moldable composition in powdered form, comprising a urea-formaldehyde condensation product, ½ to 2% hexamethylene tetramine sulphocyanide, and ½ to 2% hexamethylene tetramine.

4. A relatively stable molding composition suitable for heat and pressure molding, capable of being stored under normal conditions for relatively protracted periods without substantial decrease in its moldability under molding conditions, comprising a urea-formaldehyde condensation product, an agent capable of increasing the acidity under conditions of molding to harden the composition and hexamethylene tetramine in an amount sufficient to prevent the development of a detrimental acidity prior to molding but insufficient unduly to retard the molding operation.

EDMUND CHARLES ROSSITER.
ALFRED BROOKES.